(12) United States Patent
Laselva et al.

(10) Patent No.: US 10,313,063 B2
(45) Date of Patent: Jun. 4, 2019

(54) METHOD, SYSTEM AND APPARATUS

(71) Applicant: Nokia Solutions and Networks Oy, Espoo (FI)

(72) Inventors: Daniela Laselva, Klarup (DK); Andrea Cattoni, Nibe (DK); Claudio Rosa, Randers (DK); Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/562,664

(22) PCT Filed: Apr. 8, 2015

(86) PCT No.: PCT/EP2015/057563
§ 371 (c)(1),
(2) Date: Sep. 28, 2017

(87) PCT Pub. No.: WO2016/162054
PCT Pub. Date: Oct. 13, 2016

(65) Prior Publication Data
US 2018/0091264 A1    Mar. 29, 2018

(51) Int. Cl.
*H04W 92/10*   (2009.01)
*H04L 1/18*    (2006.01)
*H04W 84/04*   (2009.01)
*H04W 84/12*   (2009.01)
*H04W 88/06*   (2009.01)

(52) U.S. Cl.
CPC .......... *H04L 1/1829* (2013.01); *H04L 1/1854* (2013.01); *H04W 84/042* (2013.01); *H04W 84/12* (2013.01); *H04W 88/06* (2013.01)

(58) Field of Classification Search
CPC ............................ H04W 84/042; H04W 84/12
See application file for complete search history.

(56) References Cited

U.S. PATENT DOCUMENTS

2009/0285160 A1    11/2009  Cheng et al.
2013/0272280 A1*   10/2013  Kinnunen ............... H04L 5/001
                                                         370/336

FOREIGN PATENT DOCUMENTS

| EP | 1841117 A1    | 10/2007 |
| EP | 1855435 A1    | 11/2007 |
| WO | 2013/104413 A1 | 7/2013 |
| WO | 2016/070921 A1 | 5/2016 |

OTHER PUBLICATIONS

"New SI Proposal: LTE-WLAN Radio Level Integration", 3GPP TSG-RAN meeting #66, RP-141964, Agenda: 14.1.2, Intel Corporation, Dec. 8-11, 2014, 7 pages.
International Search Report and Written Opinion received for corresponding Patent Cooperation Treaty Application No. PCT/EP2015/057563, dated Dec. 4, 2015, 14 pages.

* cited by examiner

Primary Examiner — Tuan H Nguyen
(74) Attorney, Agent, or Firm — Brake Hughes Bellermann LLP

(57) ABSTRACT

There is provided a method comprising causing uplink feedback information to be transmitted via a radio interface of a first access point, wherein the uplink feedback information is associated with a protocol entity for downlink data transmission via a radio interface of a second access point only.

17 Claims, 11 Drawing Sheets

Figure 5a

S1: Causing uplink feedback information to be transmitted via a radio interface of a first access point, wherein the uplink feedback information is associated with a protocol entity for downlink data transmission via a radio interface of a second access point only

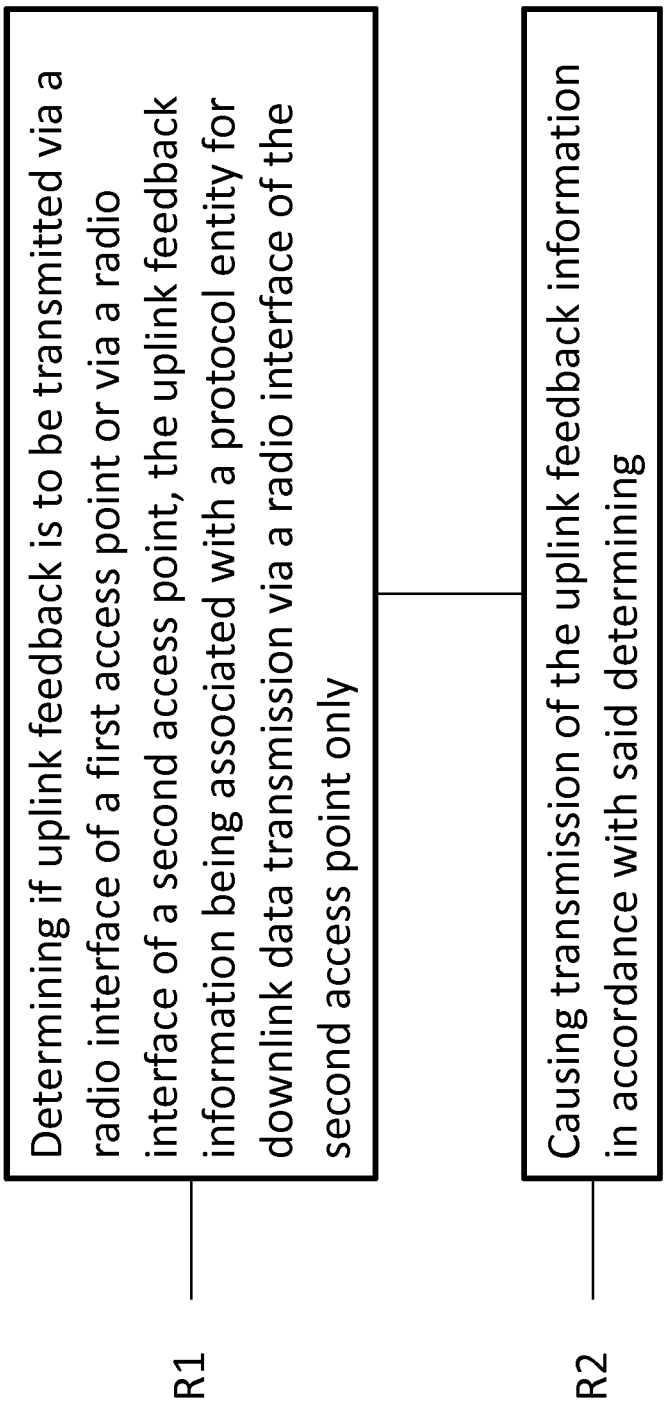

Figure 7

R1: Determining if uplink feedback is to be transmitted via a radio interface of a first access point or via a radio interface of a second access point, the uplink feedback information being associated with a protocol entity for downlink data transmission via a radio interface of the second access point only R2: Causing transmission of the uplink feedback information in accordance with said determining

METHOD, SYSTEM AND APPARATUS

RELATED APPLICATION

This application was originally filed as PCT Application No. PCT/EP2015/057563 filed Apr. 8, 2015.

FIELD

The present application relates to a method, apparatus, system and computer program and in particular but not exclusively, to network operator assisted connectivity over a second network.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of communications between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases.

SUMMARY

In a first aspect there is provided a method comprising causing uplink feedback information to be transmitted via a radio interface of a first access point, wherein the uplink feedback information is associated with a protocol entity for downlink data transmission via a radio interface of a second access point only.

The first access point may be associated with a first network and the second access point may be associated with a second, different, network.

The first network may be a cellular network and the second network may be a wireless local access network.

The first access point and the second access point may co-operate in radio aggregation.

The uplink feedback information may be associated with the downlink data transmissions received via the radio interface of the second access point.

The feedback information may be acknowledgment feedback information.

In a second aspect there is provided a method comprising determining if uplink feedback is to be transmitted via a radio interface of a first access point or via a radio interface of a second access point, the uplink feedback information being associated with a protocol entity for downlink data transmission via a radio interface of the second access point only and causing transmission of the uplink feedback information in accordance with said determining.

Determining may be based on receiving an indication of a trigger for causing the uplink feedback information to be transmitted via the radio interface of the first access point.

Determining may be based on receiving an indication of whether the uplink feedback information is to be transmitted via the radio interface of the first access point or via the radio interface of the second access point.

Determining may comprise selecting if feedback is to be caused to be transmitted via the radio interface of the first access point or via the radio interface of the second access point in dependence on at least one of load and latency information associated with at least one of the first access point and the second access point.

In a third aspect there is provided a method comprising causing downlink data transmission to a user equipment via a radio interface of a second access point and receiving uplink feedback information associated with the downlink data transmission via a radio interface of a first access point, wherein the uplink feedback information is associated with a protocol entity dedicated for the downlink data transmission only via the radio interface of the second access point.

The first access point may be associated with a first network and the second access point may be associated with a second, different, network.

The first network may be a cellular network and the second network may be a wireless local access network.

The first access point and the second access point may co-operate in radio aggregation.

The uplink feedback information may be associated with the downlink data transmissions via the radio interface of the second access point.

The feedback information may be acknowledgment feedback information.

The method may comprise causing retransmission of at least part of said downlink transmission based on the received uplink feedback information.

In a fourth aspect there is provided an apparatus, said apparatus comprising means for causing uplink feedback information to be transmitted via a radio interface of a first access point, wherein the uplink feedback information is associated with a protocol entity for downlink data transmission via a radio interface of a second access point only.

The first access point may be associated with a first network and the second access point may be associated with a second, different, network.

The first network may be a cellular network and the second network may be a wireless local access network.

The first access point and the second access point may co-operate in radio aggregation.

The uplink feedback information may be associated with the downlink data transmissions received via the radio interface of the second access point.

The feedback information may be acknowledgment feedback information.

In a fifth aspect there is provided an apparatus, said apparatus comprising means for determining if uplink feedback is to be transmitted via a radio interface of a first access point or via a radio interface of a second access point, the uplink feedback information being associated with a protocol entity for downlink data transmission via a radio interface of the second access point only and means for causing transmission of the uplink feedback information in accordance with said determining.

Determining may be based on receiving an indication of a trigger for causing the uplink feedback information to be transmitted via the radio interface of the first access point.

Determining may be based on receiving an indication of whether the uplink feedback information is to be transmitted via the radio interface of the first access point or via the radio interface of the second access point.

Determining may comprise selecting if feedback is to be caused to be transmitted via the radio interface of the first access point or via the radio interface of the second access point in dependence on at least one of load and latency information associated with at least one of the first access point and the second access point.

In a sixth aspect there is provided an apparatus, said apparatus comprising means for causing downlink data transmission to a user equipment via a radio interface of a second access point and means for receiving uplink feedback information associated with the downlink data transmission via a radio interface of a first access point, wherein the uplink feedback information is associated with a protocol entity dedicated for the downlink data transmission only via the radio interface of the second access point.

The first access point may be associated with a first network and the second access point may be associated with a second, different, network.

The first network may be a cellular network and the second network may be a wireless local access network.

The first access point and the second access point may co-operate in radio aggregation.

The uplink feedback information may be associated with the downlink data transmissions via the radio interface of the second access point.

The feedback information may be acknowledgment feedback information.

The apparatus may comprise means for causing retransmission of at least part of said downlink transmission based on the received uplink feedback information.

In a seventh aspect there is provided an apparatus comprising at least one processor and at least one memory including a computer program code, the at least one memory and the computer program code configured to, with the at least one processor, cause the apparatus at least to cause uplink feedback information to be transmitted via a radio interface of a first access point, wherein the uplink feedback information is associated with a protocol entity for downlink data transmission via a radio interface of a second access point only.

The first access point may be associated with a first network and the second access point may be associated with a second, different, network.

The first network may be a cellular network and the second network may be a wireless local access network.

The first access point and the second access point may co-operate in radio aggregation.

The uplink feedback information may be associated with the downlink data transmissions received via the radio interface of the second access point.

The feedback information may be acknowledgment feedback information.

In an eighth aspect there is provided an apparatus comprising at least one processor and at least one memory including a computer program code, the at least one memory and the computer program code configured to, with the at least one processor, cause the apparatus at least to determine if uplink feedback is to be transmitted via a radio interface of a first access point or via a radio interface of a second access point, the uplink feedback information being associated with a protocol entity for downlink data transmission via a radio interface of the second access point only and cause transmission of the uplink feedback information in accordance with said determining.

The apparatus may be configured to determine based on receiving an indication of a trigger for causing the uplink feedback information to be transmitted via the radio interface of the first access point.

The apparatus may be configured to determine based on receiving an indication of whether the uplink feedback information is to be transmitted via the radio interface of the first access point or via the radio interface of the second access point.

The apparatus may be configured to select if feedback is to be caused to be transmitted via the radio interface of the first access point or via the radio interface of the second access point in dependence on at least one of load and latency information associated with at least one of the first access point and the second access point.

In a ninth aspect there is provided an apparatus comprising at least one processor and at least one memory including a computer program code, the at least one memory and the computer program code configured to, with the at least one processor, cause the apparatus at least to cause downlink data transmission to a user equipment via a radio interface of a second access point and receive uplink feedback information associated with the downlink data transmission via a radio interface of a first access point, wherein the uplink feedback information is associated with a protocol entity dedicated for the downlink data transmission only via the radio interface of the second access point.

The first access point may be associated with a first network and the second access point may be associated with a second, different, network.

The first network may be a cellular network and the second network may be a wireless local access network.

The first access point and the second access point may co-operate in radio aggregation.

The uplink feedback information may be associated with the downlink data transmissions via the radio interface of the second access point.

The feedback information may be acknowledgment feedback information.

The apparatus may be configured to cause retransmission of at least part of said downlink transmission based on the received uplink feedback information.

In a tenth aspect there is provided a computer program embodied on a non-transitory computer-readable storage medium, the computer program comprising program code for controlling a process to execute a process, the process comprising causing uplink feedback information to be transmitted via a radio interface of a first access point, wherein the uplink feedback information is associated with a protocol entity for downlink data transmission via a radio interface of a second access point only.

The first access point may be associated with a first network and the second access point may be associated with a second, different, network.

The first network may be a cellular network and the second network may be a wireless local access network.

The first access point and the second access point may co-operate in radio aggregation.

The uplink feedback information may be associated with the downlink data transmissions received via the radio interface of the second access point.

The feedback information may be acknowledgment feedback information.

In an eleventh aspect there is provided a computer program embodied on a non-transitory computer-readable storage medium, the computer program comprising program code for controlling a process to execute a process, the process comprising determining if uplink feedback is to be transmitted via a radio interface of a first access point or via a radio interface of a second access point, the uplink feedback information being associated with a protocol entity for downlink data transmission via a radio interface of the second access point only and causing transmission of the uplink feedback information in accordance with said determining.

Determining may be based on receiving an indication of a trigger for causing the uplink feedback information to be transmitted via the radio interface of the first access point.

Determining may be based on receiving an indication of whether the uplink feedback information is to be transmitted via the radio interface of the first access point or via the radio interface of the second access point.

Determining may comprise selecting if feedback is to be caused to be transmitted via the radio interface of the first access point or via the radio interface of the second access point in dependence on at least one of load and latency information associated with at least one of the first access point and the second access point.

In a twelfth aspect there is provided a computer program embodied on a non-transitory computer-readable storage medium, the computer program comprising program code for controlling a process to execute a process, the process comprising causing downlink data transmission to a user equipment via a radio interface of a second access point and receiving uplink feedback information associated with the downlink data transmission via a radio interface of a first access point, wherein the uplink feedback information is associated with a protocol entity dedicated for the downlink data transmission only via the radio interface of the second access point.

The first access point may be associated with a first network and the second access point may be associated with a second, different, network.

The first network may be a cellular network and the second network may be a wireless local access network.

The first access point and the second access point may co-operate in radio aggregation.

The uplink feedback information may be associated with the downlink data transmissions via the radio interface of the second access point.

The feedback information may be acknowledgment feedback information.

The process may comprise causing retransmission of at least part of said downlink transmission based on the received uplink feedback information.

In an thirteenth aspect there is provided a computer program product for a computer, comprising software code portions for performing the steps the method of any one of the first, second and/or third aspects when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 5a shows a flowchart of an example method according to some embodiments;

FIG. 7 shows a flowchart of an example method according to some embodiments;

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
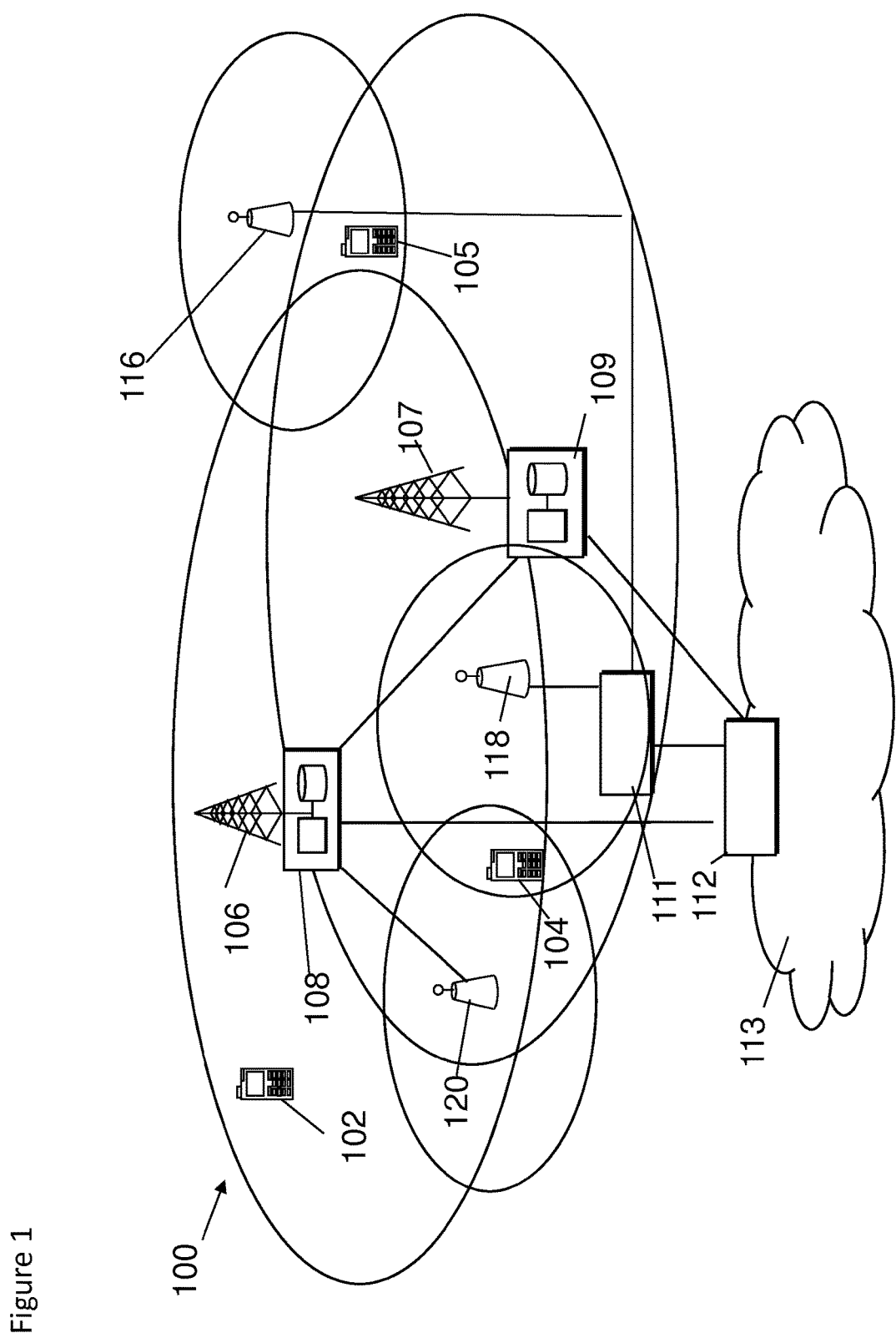
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
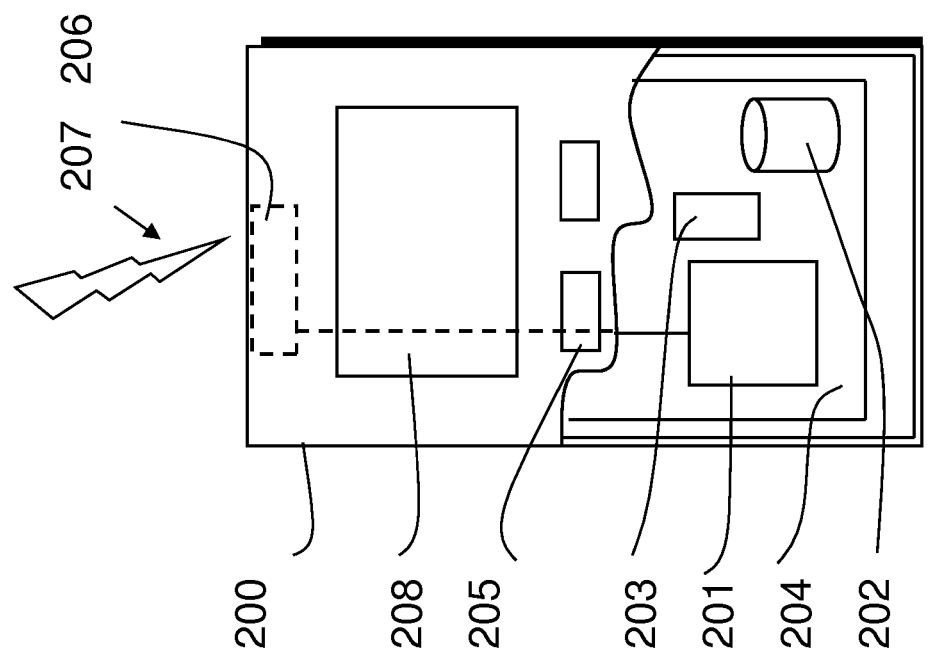
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

The following relates to LTE-WLAN tight interworking. According to a proposal, packet-wise aggregation between LTE and WLAN may be performed and a UE be served simultaneously by both radios. A proposal considers extending the benefits of integrated LTE-WLAN access to non-collocated scenarios where the eNB and AP may be connected through near-ideal backhaul links. Conceptually, this may be similar to LTE dual connectivity (DC) bearer split functionality standardized by 3GPP. LTE may act as the master node and the WLAN Access Point (AP) as the slave node. Proper combination of the data payload would be required at the UE side. The main objectives of those proposals are the support of network-control mechanisms which enable spectrum aggregation gains (including fine load balancing between LTE and WLAN).

When performing radio level packet aggregation between LTE and WLAN, an eNB determines, on a packet basis, whether to transmit a packet over LTE or WLAN. The decision may be based on performance metrics related to the dynamic performance of the two systems in terms of e.g. available capacity, packet delay, packet loss rate per system, or any other suitable performance metric. The entity at the eNB determining whether to transmit a packet over LTE or WLAN may operate on PDCP packet data units, for example.

Once a packet has been sent via either radio interface (LTE or WLAN), the detection of its unsuccessful transmission and its retransmission may be supported. Such reliable delivery is a critical function for good radio aggregation performance in order not to degrade communication performance. Unreliable delivery and packet losses may be harmful to the aggregation, stalling higher layer protocols such as transmission control protocol (TCP) which may interpret e.g. packet losses as ongoing congestion slowing down the rate. Although TCP can recover from packet loss, retransmitting missing packets causes the throughput of the connection to decrease. This drop in throughput may be due to the sliding window protocols used for acknowledgment of received packets i.e. further transmission of new segments is blocked until ACK that opens the window arrives (Retransmission timeout (RTO) is backed off exponentially at each unsuccessful retransmit of a TCP segment).

Once a packet has been sent via the LTE radio interface, lossless delivery may be assured by relying on radio link control (RLC) (layer 2) acknowledged mode (AM). In RLC AM, feedback of successful or unsuccessful delivery is provided and consequent RLC retransmissions may be sent if needed. Protocols supporting guaranteed delivery either keep on attempting transmission, or notify a control-plane protocol about a radio-link failure. However, guaranteed delivery is not supported in transmissions over WLAN. L1 retransmissions may be attempted until the maximum number of available attempts is reached. TCP may cope with the residual error to avoid repeated retransmission attempts, which may result in degrading performance as explained above.

For LTE-Wi-Fi radio aggregation, there exist different possible protocol architectures where a protocol entity (e.g. packet data convergence protocol (PDCP) or stream control transmission protocol (SCTP)) responsible for reliable data transmission over Wi-Fi may either reside in the 3GPP RAN (e.g. PDCP or SCTP) or in the Wi-Fi RAN (e.g. SCTP). Some existing solutions consider transmission of feedback information for the purpose of reliable transmission. However in these solutions, the uplink (UL) feedback is sent over a radio interface of a network node whose radio interface (either same or different) at least part of the downlink (DL) data transmissions to which the feedback is associated is received over.

In Rel-12 LTE dual connectivity (DC) there is one radio link control (RLC) entity per radio bearer per network node involved in the radio bearer, responsible for reliable transmission to the UE. The UE sends feedback information (RLC status reports carrying RLC ACKs or NACKs) directly towards the corresponding RLC entity—i.e. it transmits feedback information relative to the RLC entity residing in the MeNB (SeNB) over the air interface between UE and MeNB (SeNB).

In Rel-12 LTE DC continuous PDCP status reporting from the UE to the network has been proposed and discussed as a possible solution to handle potential issues deriving from e.g. packet loss over X2 on a split bearer. If a similar solution is adopted for LTE-Wi-Fi radio aggregation, it should be noted that in Rel-12 DC PDCP UE feedback (e.g. PDCP status reports) follows inherently the user-plane configuration. I.e. in case the user-plane is configured via SeNB, the PDCP feedback will be reported to the SeNB as well.

Besides the standardized LTE DC solution, a protocol stack for DC has been considered in which there is a single RLC entity for a split bearer, residing in the master eNB, which is responsible for reliable transmission towards the UE. For this particular architecture, the single RLC entity is free to transmit anything, data or ACK/NACK feedback, via either of the base stations serving the split bearer.

In LTE carrier aggregation, the UE sends MAC-layer UL ACK/NACK control information over the primary component carrier (PCC), including ACK/NACKs for the DL data received on the secondary component carrier (SCC). However, in this scenario the SCC belongs to the same eNB hosting the PCC.

Figure 3:
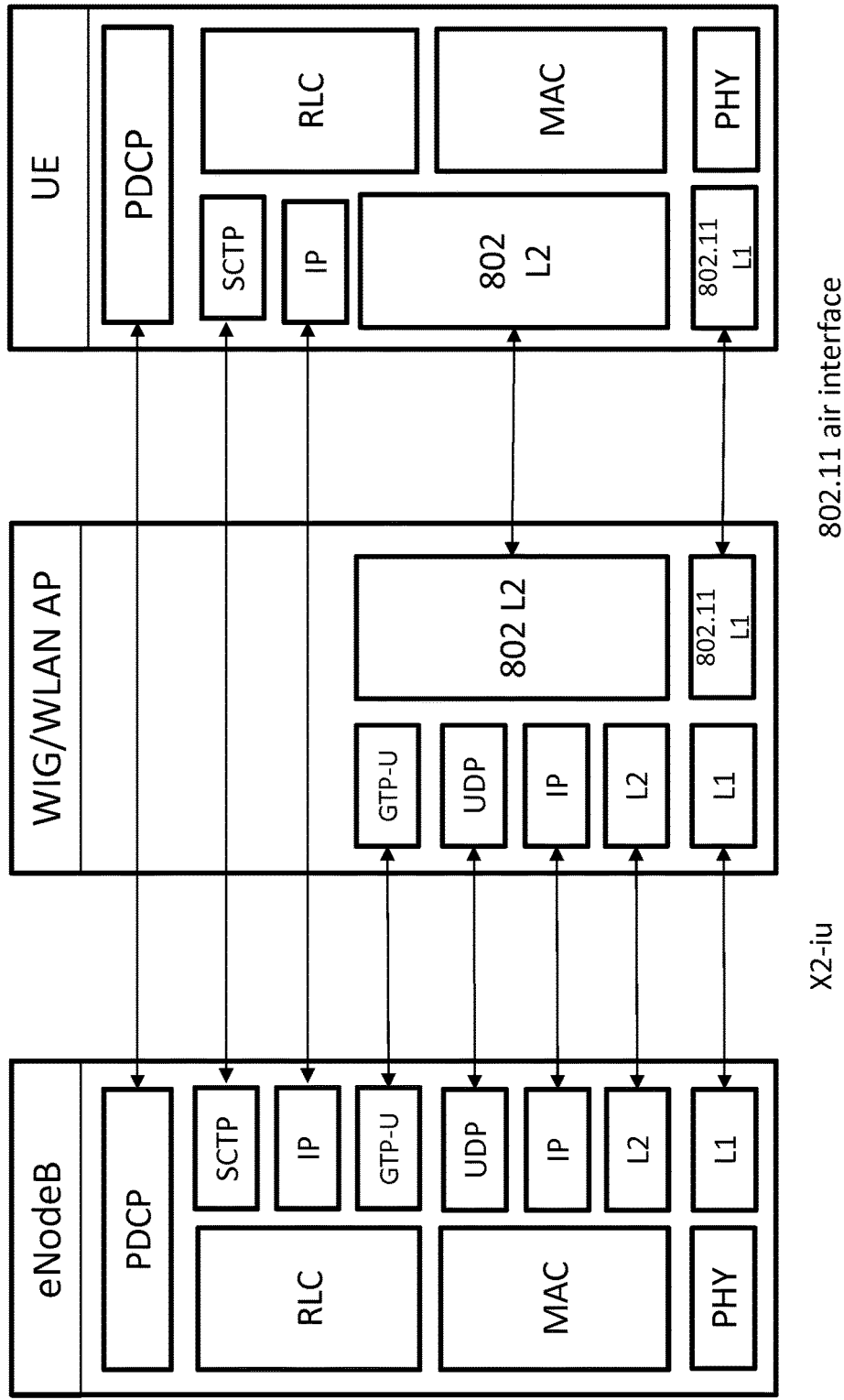
FIG. 3 shows an example protocol stack.

A protocol stack design has been proposed as shown in FIG. 3 which supports UE assisted flow control functionality and packet loss detection for the purpose of 3GPP LTE-WLAN radio aggregation. The flow control is intended for user-plane forwarding between the 3GPP RAN (eNB) and WLAN (WLAN AP/Controller/Gateway). The main idea consists in using a reliable transport protocol (such as SCTP) between the WLAN interworking gateway (WIG), or more generally, a WLAN gateway which controls multiple APs and supports interworking capabilities, and the UE (or in an alternative implementation between the eNB and the UE, cf. FIG. 3) which operates below PDCP (i.e. it conveys PDCP PDUs) on the U-plane path between the WIG (or eNB) and the UE. Then flow control and packet loss detection for the WLAN path can be based on the performance of such reliable transport protocol (either based on the performance of the entire path or on the next hop).

In the 802.11 unicast operations, a station transmits the packet and waits for an ACK. If the receiver successfully receives the packet, it waits for a short inter-frame spacing time (SIFS) and then transmits an ACK frame. If the sender does not receive an ACK (e.g., due to a collision or poor channel condition), it retransmits the packet in its original form using binary exponential back-off, where its contention window is doubled every time after a failed transmission until it reaches its maximum value, denoted as CWmax. After the maximum number of retransmissions configured, WLAN MAC simply discards a packet which has not been acknowledged without any further actions.

Figure 4:
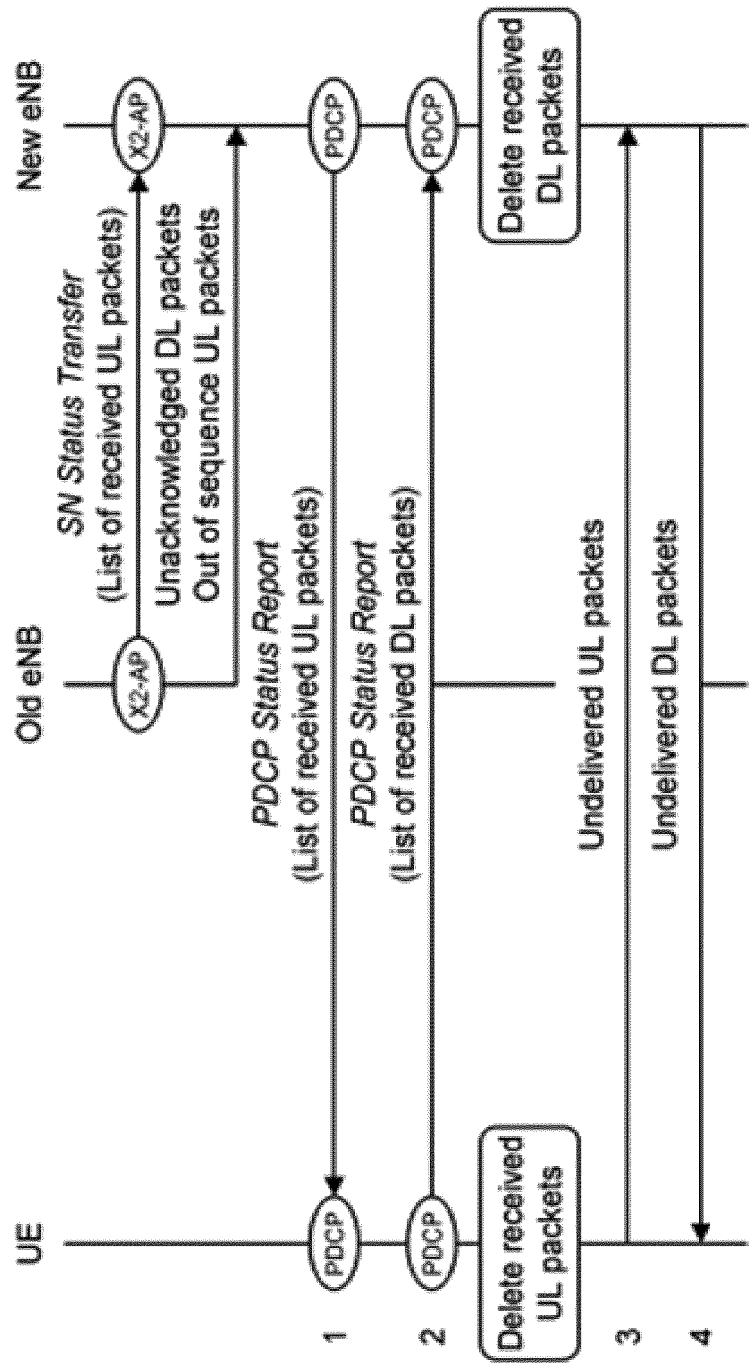
FIG. 4 shows an example signaling procedure.

Seamless handover in LTE is designed based on the properties of RLC and PDCP protocol layers. First, data forwarding over the X2 interface occurs from the source to the target eNB during the handover (X2-AP SN Status Transfer message). The forwarding is made for all unacknowledged PDCP SDUs as based on the last received RLC status report sent by the UE. This report includes the information about what RLC PDU the UE has received and what it has not received. As the RLC report may have been lost or may not have reflected the most up-to-date status, in order to prevent the retransmission of already correctly received PDCP PDUs, a second procedure of PDCP status report is added. The UE can be configured to send a PDCP status report to the target BS after the handover. That is, a PDCP control PDU conveying a PDCP status report includes the PDCP Sequence Number (SN) of the first missing PDCP SDU and a bitmap of the packets (SN) which are missing and need to be retransmitted and what are not missing. The procedure is illustrated in FIG. 4.

With LTE-WLAN radio aggregation, allowing the UE feedback for the packets originally transmitted over WLAN to be reported via WLAN only may result in degraded WLAN performance. This observation may be particularly valid in case transmission failures occur due to WLAN congestion, since the feedback will further increase the medium contention. The average loss rate in WLAN, which in some deployments may be as high as 20-40%, increases with the number of active clients as it increases contention in the network. Such increase may have negative consequences for rate adaptation. Some adaptation algorithms may reduce their transmission rate when experiencing losses. But when losses are caused by contention, rate reduction is unlikely to help, and may occupy the media for a longer time. On the contrary, for uncongested WLAN, the UE reporting via WLAN may be faster and pose less overhead on the LTE.

The following embodiments relate to, for UEs configured to operate in LTE-WLAN radio aggregation mode, a UE reporting to the network of whether transmissions over WLAN were unsuccessful or not.

FIG. 5a shows a flowchart of a method comprising, in a first step S1, causing uplink feedback information to be transmitted via a radio interface of a first access point, wherein the uplink feedback information is associated with a protocol entity for downlink data transmission via a radio interface of a second access point only.

Figure 5B:
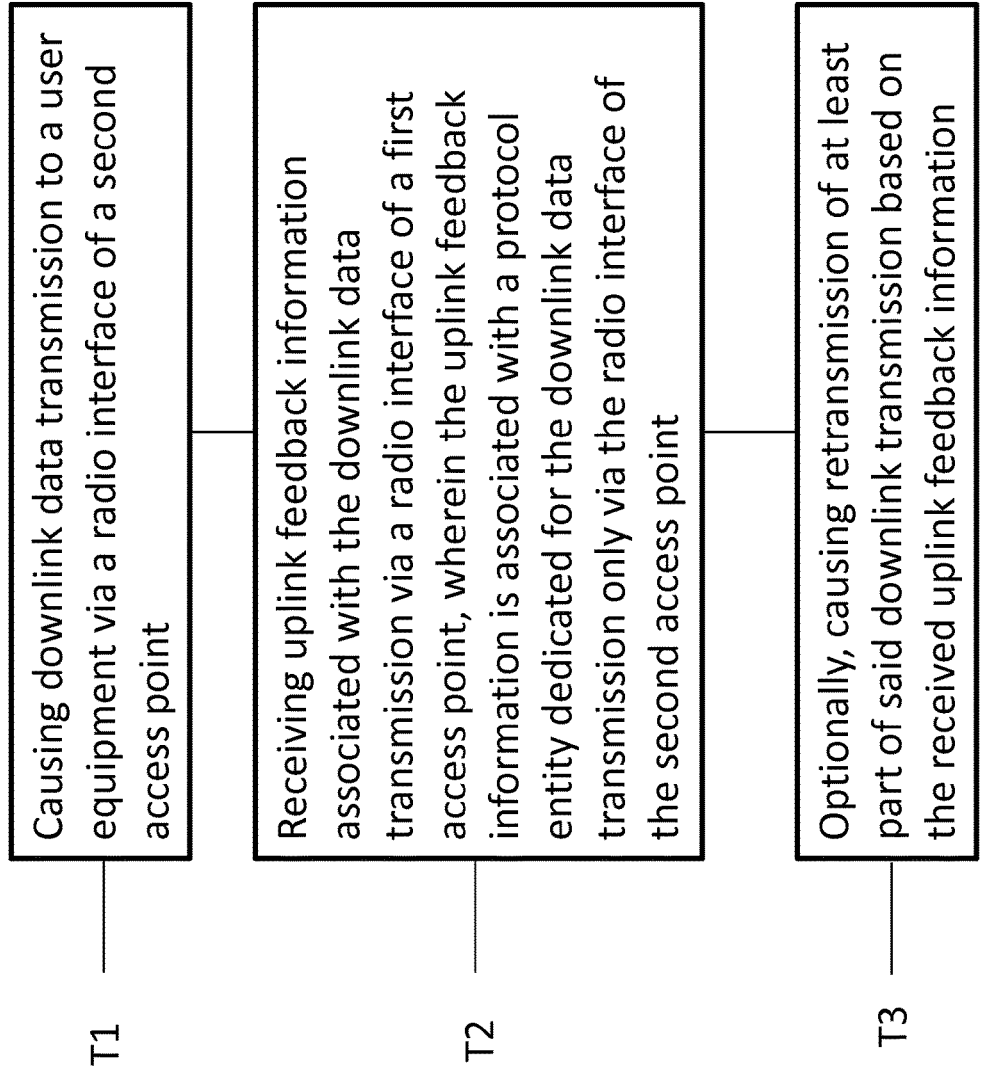
FIG. 5b shows a flowchart of an example method according to some embodiments.

FIG. 5b shows a flowchart of an example method comprising, in a first step, T1 causing downlink data transmission to a user equipment via a radio interface of a second access point and in a second step T2, receiving uplink feedback information associated with the downlink data transmission via a radio interface of a first access point, wherein the uplink feedback information is associated with a protocol entity dedicated for the downlink data transmission only via the radio interface of the second access point. The method may comprise, in a third step T3, causing retransmission of at least part of said downlink transmission based on the received uplink feedback information.

A protocol entity for downlink data transmission via a radio interface of a second access point only may be a protocol entity defined for or allowed to handle DL data transmission of the second access point (e.g. the WLAN-AP) only. For example, any needed retransmissions (as requested by the UL feedback) for the DL data received over the WLAN branch are decided by this protocol entity. Thus, typically the UL feedback would be sent by the UE over the radio interface of the WLAN, as the protocol entity is responsible for the radio/air interface of the WLAN. However, according to the advantageous solution, the UE may send the UL feedback even in such case via the radio interface of the LTE-eNB (as an example of a first access node).

The first access point may be associated with a first network, e.g. a cellular network, and the second access point may be associated with a second, different network, such as a WLAN. The first network may be an LTE network. The first access point and the second access point may cooperate in radio aggregation, such as LTE-WLAN tight interworking.

In one embodiment, the UL acknowledgement feedback information may comprise layer two acknowledgment feedback information. In one example, the feedback information may be L2 feedback related to DL data received over the WLAN. In one embodiment, the UL acknowledgement feedback information may comprise acknowledgement feedback information based on sequence numbers of downlink packets. In one embodiment, the UL acknowledgement feedback information does not comprise layer 1 HARQ feedback. In one embodiment, the UL acknowledgement feedback information is associated with DL data received over the radio interface of the second access point, such as over the WLAN interface. The UL acknowledgement feedback information may enable or provide guaranteed delivery for the DL data received over the radio interface of the second access point. In one embodiment, the feedback information may be acknowledgement feedback information, e.g. ACKs, NACKs and SACKs (selective ACKs).

There are different architectural options for where the protocol entity (e.g. SCTP) is terminated. A protocol entity (such as SCTP or RLC) may reside either in the radio network (e.g. WLAN) of the second access point or in the radio network (e.g. cellular network, such as LTE or LTE-A, or 5G) of the first access point. In one embodiment, the protocol entity may reside in the WLAN gateway which controls multiple APs, such as in the WIG, (as shown in FIG. 6).

Figure 6:
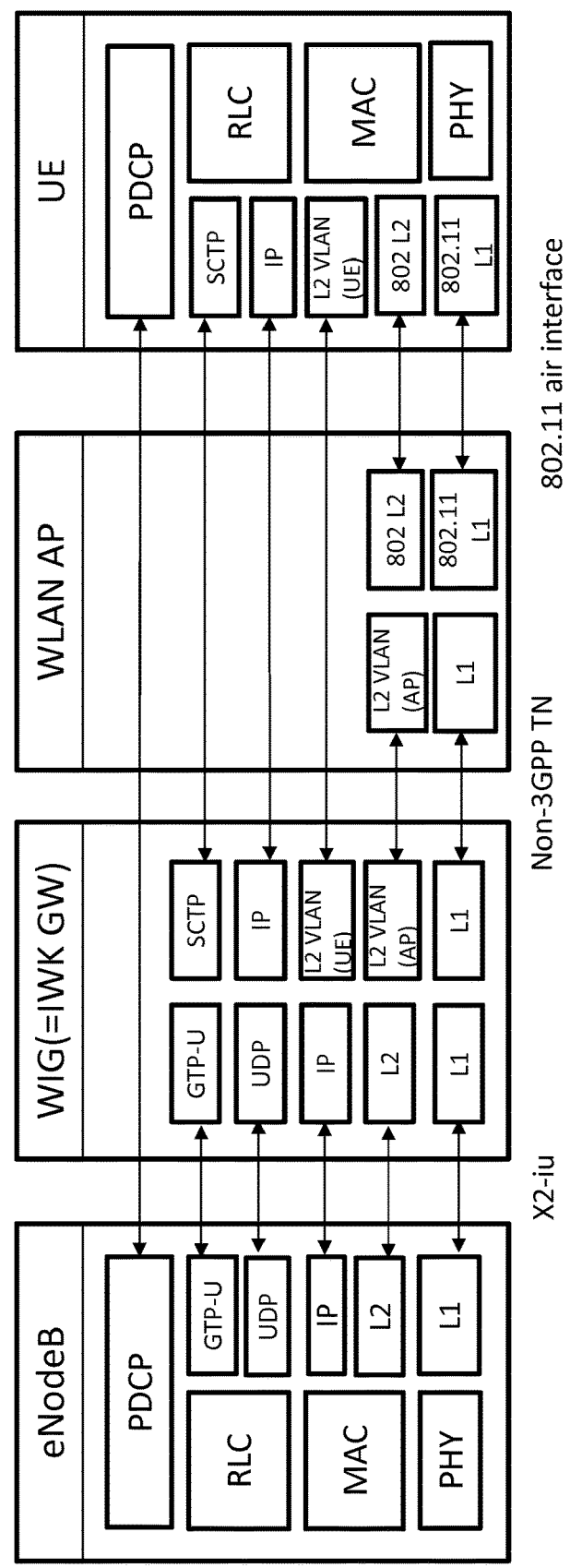
FIG. 6 shows an example protocol stack according to some embodiments.

FIG. 6 shows one example protocol architecture conceivable for LTE-WLAN radio aggregation, in this example architecture, SCTP serves as an example of a protocol dedicated to data transmission over WLAN only (whereas in this example the RLC/MAC/PHY sub-stack is dedicated to data transmission over the LTE air interface only). In a case such as that shown in FIG. 6, the connection between eNB and WIG may be through an X2-alike interface and tunneling, and the WIG encapsulates the SCTP.

In one embodiment the protocol entity may reside in the eNB (as shown in FIG. 3). In a scenario such as that of FIG. 3, other protocols, such as RLC may be used. In a case such as that of FIG. 3, WIG (or the AP) may need a tunnel termination for the X2-type of transport. In an embodiment, the protocol entity may reside in the second access point. In one example, in the case the bearer split is made at the PDCP layer, the PDCP status report may be extended to the operations of LTE-WLAN radio aggregation. That is, such report may be configured for UEs operating in LTE-WLAN aggregation mode to be reported to the LTE node. The UE may generate the report of the PDCP PDUs received via the WLAN and LTE paths. The generated report may comprise an indication of which PDUs among the ones sent via WLAN and LTE are missing (and need to be retransmitted) and which are not missing.

Alternatively, or in addition, in the case that the bearer split is made at the PDCP layer and SCTP is used over WLAN, below the PDCP, terminated at the eNB and the UE, a SCTP status report provided by the UE SCTP termination to the eNB including selective ACKs (SACKs) may be used to identify which individual PDCP/SCTP packets have been received via WLAN and which not.

The proposed method may provide efficient packet loss detection of WLAN transmissions by means of configurable feedback information, e.g. L2, reporting of the UE for the purpose of 3GPP LTE-WLAN radio aggregation. It may be possible to differentiate between the tighter latency requirements of the UE feedback and the capacity requirements posed by the user plane. Also, assured delivery necessary to achieve good LTE-WLAN aggregation performance may be supported with minimal impact to legacy Wi-Fi APs. The proposed method may help to avoid higher layer retransmissions, such that improved performance and reduced delay can be achieved.

FIG. 7 shows a flowchart of an example method. The method shown in FIG. 7 comprises, in a first step R1, determining if uplink feedback is to be transmitted via a radio interface of a first access point or via a radio interface of a second access point, the uplink feedback information being associated with a protocol entity for downlink data transmission via a radio interface of the second access point only. In a second step R2, the method comprises causing transmission of the uplink feedback information in accordance with said determining.

In an embodiment, said determining may comprise selecting if uplink feedback is to be transmitted via a radio interface of the first access point or the radio interface of the second access point, depending on autonomous measurements. Autonomous measurements may comprise, for example, load and/or latency measurements of the first access point and/or the second access point. For example, autonomous measurements may be, but are not limited to, measurements of the load in a Wi-Fi AP (such as BSS load, number of un-successful transmission attempts when CSMA-like and/or LBT mechanisms are deployed, value of back-off time when CSMA-like mechanism is deployed, and any other suitable measurements). In one embodiment, a UE may be configured with threshold values with respect to the load and/or latency information.

In one embodiment, the selection if uplink feedback is to be transmitted via a radio interface of the first access point or the radio interface of the second access point may depend on absence of simultaneous uplink user-plane data at the feedback-providing protocol. In the presence of simultaneous uplink user-plane data at the feedback-providing protocol the feedback may be mandated to be piggybacked with the data (and hence sent over the same radio interface as the uplink user-plane data).

In an embodiment, an indication of a trigger for causing feedback information to be transmitted via an access point of a first network may be provided to a UE. For example, indicated triggers may be (but are not limited to): periodic trigger, event-based as based on meeting the configured threshold(s). Examples of the thresholds could be: maximum packet error rate experienced over WLAN, maximum packet delay experienced over WLAN, minimum data rate experienced over WLAN. In an embodiment, an access point of the first network, e.g. an eNB, may configure a UE, operating in LTE-WLAN aggregation mode, to provide feedback information, such as upper L2 feedback related to the outcome of WLAN transmissions. The eNB may configure the UE via an RRC message with the indication of the triggers to start sending the L2 feedback report, e.g. PDCP/RLC/SCTP status report, and related thresholds.

In an embodiment, the UE may receive an indication of whether the feedback is to be transmitted, or carried, via the radio interface of the first access point or via the radio interface of the second access point, or via both interfaces. This indication may be irrespective of which radio network is used to carry the uplink user-plane data of the feedback-providing protocol, and independently of where the protocol entity responsible for reliable transmission via Wi-Fi is terminated (i.e. in the first network, such as 3GPP RAN, or in the second network, such as Wi-Fi), and independently of whether this protocol entity is dedicated to data transmission over the second network only in the protocol architecture used for the radio aggregation.

As an example, the radio interface of the first AP e.g. an eNB, may indicate via the RRC to the UE whether the feedback information, e.g. PDCP/RLC/SCTP status report, should be sent either over the WLAN radio interface or over the LTE radio, or both. Such UE configuration may occur when the UE starts operating in LTE-WLAN aggregation mode. Also, a reconfiguration may occur while the UE is already operating in LTE-WLAN aggregation mode and may be required due to changes in WLAN performance.

Determining which indication to provide to the UE and when, may depend on the AP congestion level. Using the example of LTE WLAN aggregation, in the case of low AP load level the reporting may be sent over WLAN as a fast report is expected; when detecting an increasing in the AP load level, the eNB may configure the UE to report via LTE. L2 reports sent to the WLAN may be forwarded to the eNB via the interface between LTE and WLAN.

Methods as described with reference to FIGS. 5a and 5b and FIG. 7 may enable assured delivery, which is a critical functionality to achieve good performance for LTE-WLAN aggregation. By avoiding higher layer retransmissions, improved performance and reduced delay can be achieved, allowing a smooth eNB-to-UE data flow. Assured delivery may be achieved with limited/no changes to legacy WLAN APs. Avoiding any impact on the AP makes it possible for an operator to use the existing WLAN AP footprint without the need to swap it when deploying radio aggregation. WLAN degradation in case of temporary increase of WLAN load/congestion may be reduced, avoiding extra medium contention which would be caused by the signalling of UE L2 feedback.

When UE feedback can be configured via LTE or via Wi-Fi irrespective of which radio interface carries the related user-plane data, consideration about power consumption may be taken into account. Flow control for user-plane forwarding between the 3GPP RAN (eNB) and WLAN (WLAN AP/Controller/Gateway) based on the proposed UE feedback may be supported.

It should be understood that each block of the flowchart of FIG. 5 and any combination thereof may be implemented by various means or their combinations, such as hardware, software, firmware, one or more processors and/or circuitry.

Figure 8:
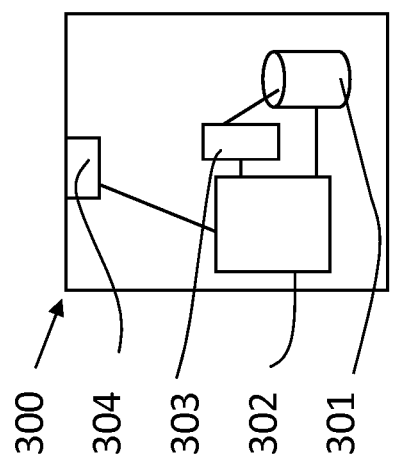
FIG. 8 shows a schematic diagram of an example control apparatus.
Figure 9:
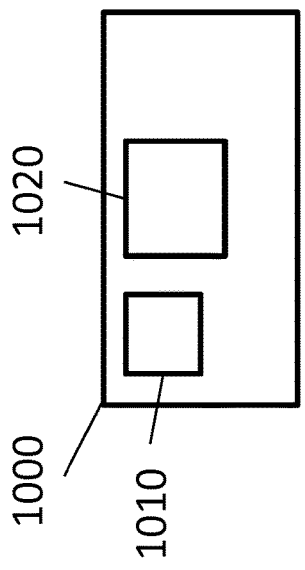
FIG. 9 shows a schematic diagram of an apparatus.

The method may be implemented on a mobile device as described with respect to FIG. 2 or control apparatus as shown in FIG. 8. FIG. 8 shows an example of a control apparatus for a communication system, for example to be coupled to and/or for controlling a station of an access system, such as a RAN node, e.g. a base station or (e) node B, or a node of a core network such as an MME, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may comprise causing uplink feedback information to be transmitted via a radio interface of a first access point, wherein the uplink feedback information is associated with a protocol entity for downlink data transmission via a radio interface of a second access point only. Alternatively or additionally, control functions may comprise determining if uplink feedback is to be transmitted via a radio interface of a first access point or via a radio interface of a second access point, the uplink feedback information being associated with a protocol entity for downlink data transmission via a radio interface of the second access point only and causing transmission of the uplink feedback information in accordance with said determining. Alternatively or in addition, control functions may comprise causing downlink data transmission to a user equipment via a radio interface of a second access point and receiving uplink feedback information associated with the downlink data transmission via a radio interface of a first access point, wherein the uplink feedback information is associated with a protocol entity dedicated for the downlink data transmission only via the radio interface of the second access point An example of an apparatus 900 shown in FIG. 9 comprises means 910 for causing uplink feedback information to be transmitted via a radio interface of a first access point, wherein the uplink feedback information is associated with a protocol entity for downlink data transmission via a radio interface of a second access point only.

Figure 10:
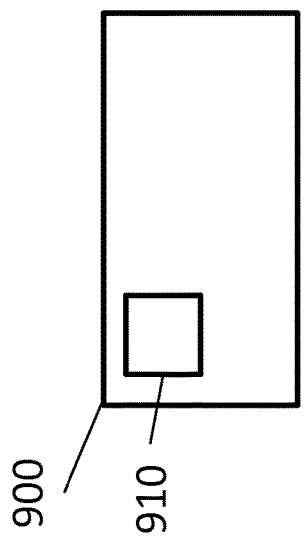
FIG. 10 shows a schematic diagram of an apparatus.

An example of an apparatus 1000 shown in FIG. 10 comprises means 1010 for determining if uplink feedback is to be transmitted via a radio interface of a first access point or via a radio interface of a second access point, the uplink feedback information being associated with a protocol entity for downlink data transmission via a radio interface of the second access point only and means 1020 for causing transmission of the uplink feedback information in accordance with said determining.

Figure 11:
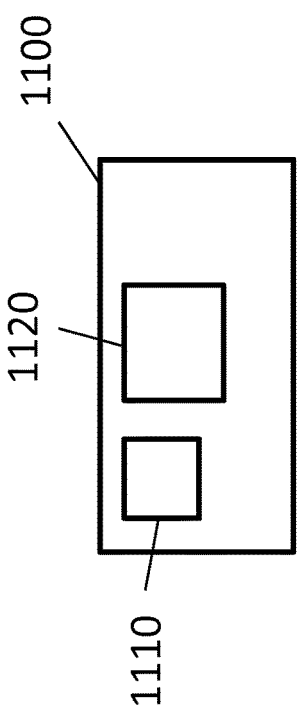
FIG. 11 shows a schematic diagram of an apparatus.

An example of an apparatus 1100 shown in FIG. 11 comprises means 1110 for causing downlink data transmission to a user equipment via a radio interface of a second access point and means 1120 for receiving uplink feedback information associated with the downlink data transmission via a radio interface of a first access point, wherein the uplink feedback information is associated with a protocol entity dedicated for the downlink data transmission only via the radio interface of the second access point.

Figure 12:
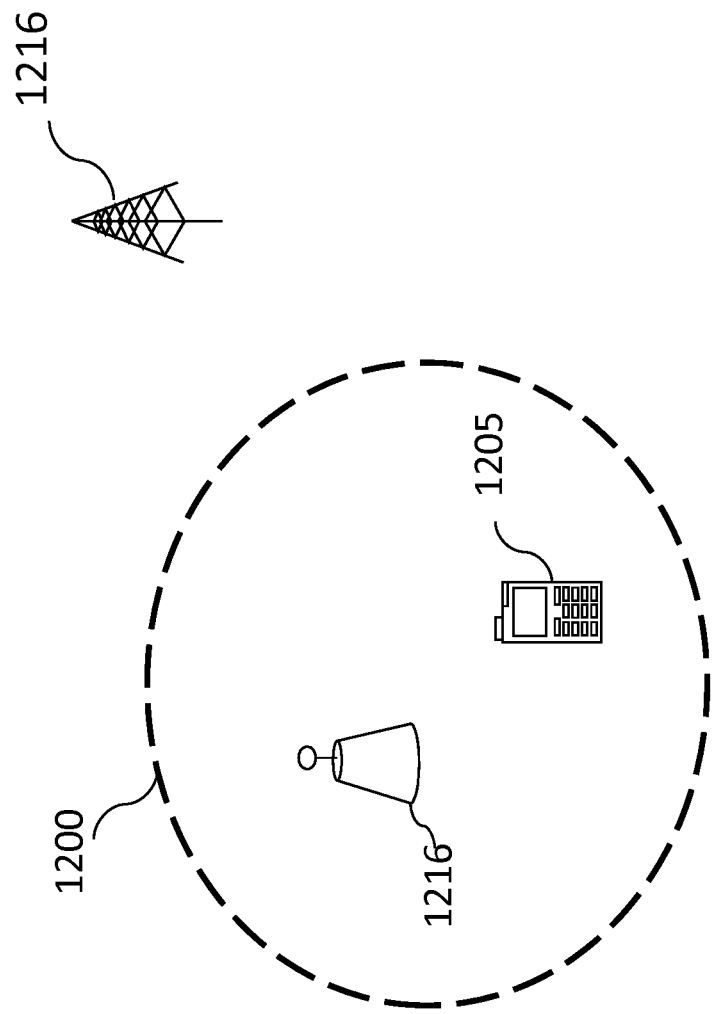
FIG. 12 shows a schematic diagram of an example communication system.

FIG. 12 shows a system in which embodiments may be implemented. The example system comprises a WLAN AP 1216 within the coverage area 1200 of a first cell of an LTE network, a UE 1205 and a RAN node 1216. The RAN node may comprise apparatus 1100 as described with respect to FIG. 11. The UE may comprise apparatus 900 and/or 1000. The apparatus of the system may be as described with respect to the system of FIG. 1 and device of FIG. 2.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 3GPP and WLAN, similar principles can be applied in relation to other cellular networks and wireless local area networks and to any other communication system where interworking between two networks is supported. For example, although the description assumed WLAN as the network of the second access point/node, the second network may be any other radio network as well. For example, the first access node may operate on a licensed band whereas the second access point may be operating on an unlicensed band (as in e.g. LTE-unlicensed, LTE-U, or licensed assisted access, LAA). Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
at least one processor and at least one memory including a computer program code, wherein the at least one memory and the computer program code are configured, with the at least one processor, to cause the apparatus at least to:
cause uplink feedback information to be transmitted via a radio interface of a first access point, wherein the uplink feedback information is associated with a protocol entity that is allowed to handle downlink data transmission via a radio interface of a second access point and is not allowed to handle downlink data transmission via the radio interface of the first access point, wherein, based on the uplink feedback information, one or more further downlink data transmissions via the radio interface of the second access point are controlled or decided by the protocol entity.

2. The apparatus according to claim 1, wherein the first access point is associated with a first network and the second access point is associated with a second, different, network.

3. The apparatus according to claim 2, wherein the first network is a cellular network and the second network is a wireless local access network.

4. The apparatus according to claim 1, wherein the first access point and the second access point co-operate in radio aggregation.

5. The apparatus according to claim 1, wherein the uplink feedback information is associated with the downlink data transmissions received via the radio interface of the second access point.

6. The apparatus according to claim 1, wherein the feedback information is acknowledgment feedback information.

7. An apparatus comprising:
at least one processor and at least one memory including a computer program code, wherein the at least one memory and the computer program code are configured, with the at least one processor, to cause the apparatus at least to:
determine if uplink feedback information is to be transmitted via a radio interface of a first access point or via a radio interface of a second access point, the uplink feedback information being associated with a protocol entity that is allowed to handle downlink data transmission via a radio interface of the second access point and is not allowed to handle downlink data transmission via the radio interface of the first access point; and
cause transmission of the uplink feedback information in accordance with said determining, wherein there are different protocol entities for handling downlink data transmissions for the first access point and for the second access point.

8. The apparatus according to claim 7, wherein the determining is based on receiving an indication of a trigger for causing the uplink feedback information to be transmitted via the radio interface of the first access point.

9. The apparatus according to claim 7, wherein the determining is based on receiving an indication of whether the uplink feedback information is to be transmitted via the radio interface of the first access point or via the radio interface of the second access point.

10. The apparatus according to claim 7, wherein the at least one memory and the computer program code are configured, with the at least one processor, to cause the apparatus further to: select whether feedback is to be caused to be transmitted via the radio interface of the first access point or via the radio interface of the second access point in dependence on at least one of load and latency information associated with at least one of the first access point and the second access point.

11. An apparatus comprising:
at least one processor and at least one memory including a computer program code, wherein the at least one memory and the computer program code are configured, with the at least one processor, to cause the apparatus at least to:
cause downlink data transmission to a user equipment via a radio interface of a second access point; and
cause reception of uplink feedback information associated with the downlink data transmission via a radio interface of a first access point, wherein the uplink feedback information is associated with a protocol entity dedicated for the downlink data transmission only via the radio interface of the second access point, wherein, based on the uplink feedback information, one or more further downlink data transmissions via the radio interface of the second access point are controlled or decided by the protocol entity.

12. The apparatus according to claim 11, wherein the first access point is associated with a first network and the second access point is associated with a second, different, network.

13. The apparatus according to claim 12, wherein the first network is a cellular network and the second network is a wireless local access network.

14. The apparatus according to claim 11, wherein the first access point and the second access point co-operate in radio aggregation.

15. The apparatus according to claim 11, wherein the uplink feedback information is associated with the downlink data transmissions via the radio interface of the second access point.

16. The apparatus according to claim 11, wherein the feedback information is acknowledgment feedback information.

17. The apparatus according to claim 11, wherein the at least one memory and the computer program code are configured, with the at least one processor, to cause the apparatus further to:
cause retransmission of at least part of said downlink transmission based on the received uplink feedback information.

* * * * *